No. 699,992. Patented May 13, 1902.
S. S. WALES.
HOISTING APPARATUS.
(Application filed Oct. 29, 1901.)
(No Model.)
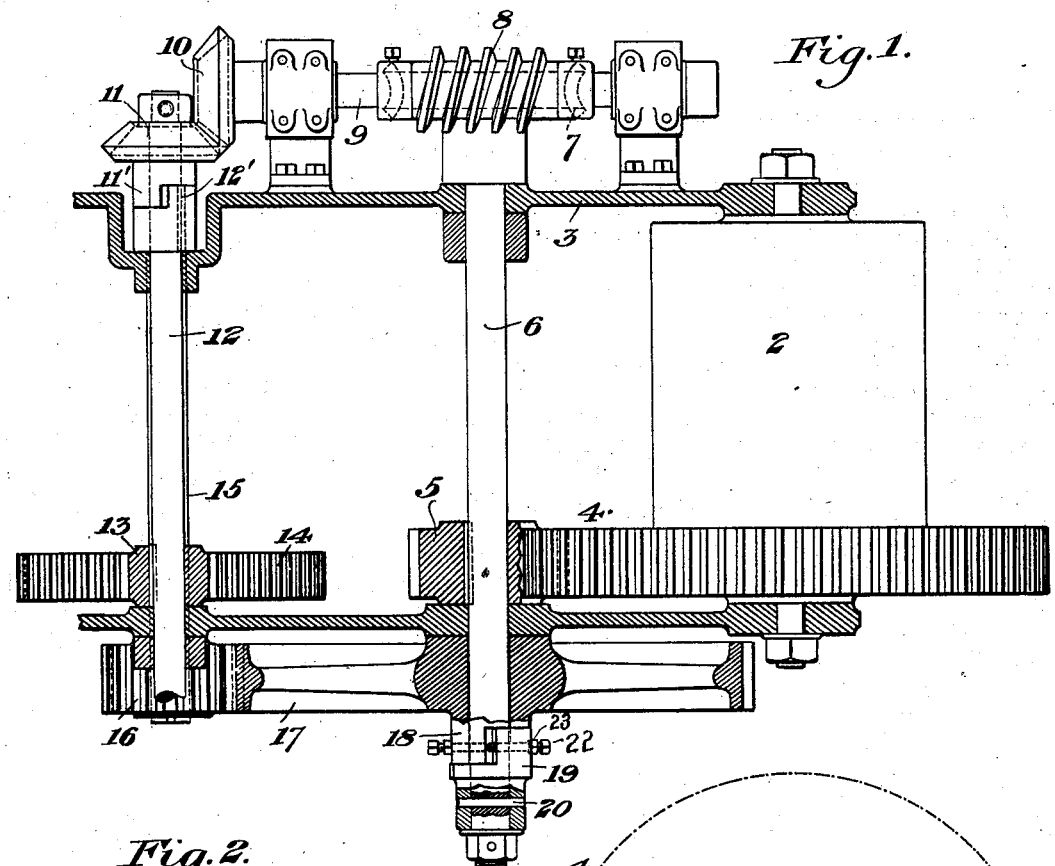
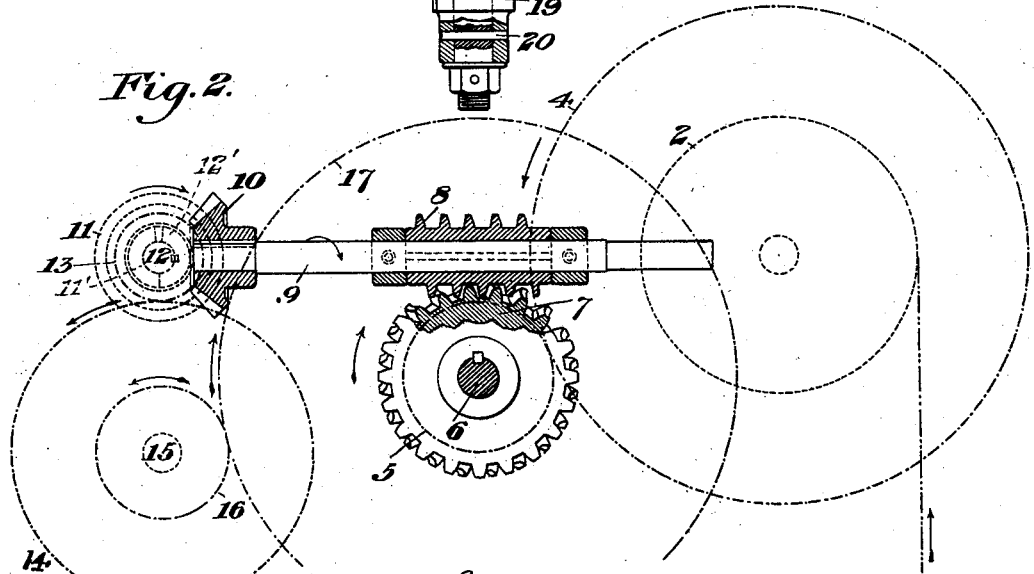
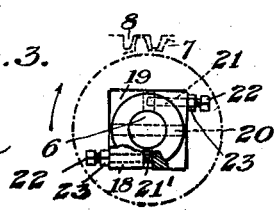
WITNESSES
INVENTOR

UNITED STATES PATENT OFFICE.

SAMUEL S. WALES, OF MUNHALL, PENNSYLVANIA.

HOISTING APPARATUS.

SPECIFICATION forming part of Letters Patent No. 699,992, dated May 13, 1902.

Application filed October 29, 1901. Serial No. 80,416. (No model.)

*To all whom it may concern:*

Be it known that I, SAMUEL S. WALES, of Munhall, Allegheny county, Pennsylvania, have invented a new and useful Hoisting Apparatus, of which the following is a full, clear, and exact description, reference being had to the accompanying drawings, forming part of this specification, in which—

Figure 1 is a top plan view, partly broken away, showing hoisting-gearing constructed in accordance with my invention. Fig. 2 is a side elevation of the same, partly broken away; and Fig. 3 is an end elevation, partly in section, showing the clutch I employ.

My invention relates to the class of power-gearing for hoisting or similar purposes and is designed to combine a worm-gear connection and a spur-wheel-gear connection in such a manner that when the drum or other rotary element is rotated in one direction the worm is out of mesh with its worm-wheel, though both are being rotated, while the driving of the drum or rotary element in the other direction causes the worm and worm-wheel to engage each other, the power thus passing through this connection.

In the drawings, in which I have shown my invention as applied to hoisting apparatus, 2 represents a hoisting-drum mounted in suitable bearings on the frame 3 on the trolley or other support. On the shaft of the drum is provided a toothed wheel 4, which intermeshes with a pinion 5, keyed to a shaft 6, to one end of which is keyed or otherwise secured the worm-wheel 7.

8 is a worm arranged to engage the worm-wheel 7 in lowering, this worm being secured to a shaft 9, having bevel-wheel 10, intermeshing with bevel-wheel 11, loosely mounted on transverse shaft 12, and provided with a jaw-clutch 11'. The shaft 12 is the power-shaft, and keyed to it is a clutch member 12', which engages the clutch member 11' of the bevel-wheel 11. These clutch members have a certain amount of lost motion, so that the shaft 12 may turn a certain distance before actuating the worm-gearing. A pinion 13 is secured to the shaft 12, and this pinion intermeshes with a toothed wheel 14, carried on a shaft 15, to which is also secured the pinion 16. The pinion 16 intermeshes with a toothed wheel 17, loosely mounted on a shaft 6 and connected to it by another lost-motion clutch. Of the two clutch members of this connection the one, 18, is rigid with the wheel 17, while the other member, 19, is secured to the shaft 6 by a pin 20. These two clutch members also have lost motion between their faces, and through them extend screws 21 21', having outer wrench-faces 22 to adjust them. When adjusted, the screws are clamped by nuts 23. By suitable adjustment of the screws 21 or contact-pieces the amount of lost motion in this clutch for hoisting may be adjusted as desired, so as to throw the worm and worm-wheel out of contact with each other.

The screw 21' or adjusting-piece is used for adjustment of the lost motion in clutch 18 19 when driving the drum for lowering when there is no load upon the drum sufficient to make it run down, the screw 21' performing an adjustment similar to that accomplished by the screw 21 and effecting the disengagement of the worm and worm-wheel, as previously described.

In the operation of the apparatus when power is applied to hoist a weight the parts assume the positions shown in the drawings, and in this position, on account of the lost motion in the clutches, the teeth of the worm are out of contact with those of the worm-wheel, clearance-space being afforded between the worm-wheel teeth for this purpose. The power for rotating the drum therefore passes through the wheels 13, 14, 16, and 17, the pinion 5, and wheel 4. The worm and worm-wheel are operated independently of each other, however, after the lost motion between the jaws of clutch members 11' 12' is taken up. The worm-wheel rotates by reason of being secured to the shaft 6 and the worm by its connection with the shaft 12 through the clutch members 11' 12' and the bevel-gearing. When the motion of the parts is reversed for the lowering of a weight suspended from the drum, the pinion 16 acts upon the wheel 17 and turns it upon the shaft until the strain on clutch 18 19 is relieved, and in this first part of the operation of the reverse movement the shaft 9 is not operated by reason of the lost motion between the jaws of the clutch 11' 12', which brings the worm-wheel into engagement with the worm. As the parts turn in this position after the lost motion in the clutch 11' 12' is taken up, the weight acts through the worm-gear which sustains the pressure while the spur-gearing is turning freely at the same time. I thus obtain the advantages flowing from the use of worm-gearing in lowering a weight suspended from the drum, while at the same time the large losses from friction when screw-gearing is used for hoisting are done away with.

It will be noted that the worm-gearing is in mesh only while lowering a weight suspended from the drum. When it is necessary to drive the drum in either direction, the spur-gearing is operated and the elements of the worm-gearing are not in operative connection by reason of the adjustment in the clutch 18 19 and the lost motion in the clutch members 11' 12'. I have found after considerable experimenting that at least two lost-motion clutches are necessary in this connection, since with only one such clutch the hoist can only be adjusted to suit one of the two positions— that is, raising or lowering—and the lost motion furnished by the backlash of the gearing is not sufficient to clear the two trains of gearing from each other without at least two lost-motion clutches.

Many variations may be made in the form and arrangement of the screw-gearing connections and the other gearing connections, and the system may be applied to rotary elements other than hoisting-drums without departing from my invention.

I claim—

1. A rotary element having two sets of driving connections, one set including worm-gearing, and connections between the two sets, said connections including a plurality of clutches, each having lost motion; substantially as described.

2. A rotary element having spur-gear driving connections and worm-gear driving connections, the spur-gear having a plurality of connections with the worm-gear, said connections including at least two clutches having lost motion; substantially as described.

3. A rotary element having spur-gearing driving connections, one of the shafts of the spur-gears having lost-motion clutch connection with a worm-gear, mechanism for driving the other element of the worm-gear, and means for adjusting the amount of lost motion in the clutch; substantially as described.

4. A rotary element having spur-gearing driving connections, worm-gearing driving connections, the shafts of the spur-gears being provided with lost-motion clutch connections with the worm-gearing elements, one at least of said lost-motion connections being adjustable; substantially as described.

In testimony whereof I have hereunto set my hand.

SAMUEL S. WALES.

Witnesses:
GEO. B. BLEMING,
L. A. CONNER, Jr.